US011941080B2

(12) United States Patent
Tran et al.

(10) Patent No.: US 11,941,080 B2
(45) Date of Patent: Mar. 26, 2024

(54) SYSTEM AND METHOD FOR LEARNING HUMAN ACTIVITIES FROM VIDEO DEMONSTRATIONS USING VIDEO AUGMENTATION

(71) Applicant: Retrocausal, Inc., Sammamish, WA (US)

(72) Inventors: Quoc-Huy Tran, Redmond, WA (US); Muhammad Zeeshan Zia, Sammamish, WA (US); Andrey Konin, Redmond, WA (US); Sanjay Haresh, Karachi (PK); Sateesh Kumar, Karachi (PK)

(73) Assignee: Retrocausal, Inc., WA (US)

( * ) Notice: Subject to any disclaimer, the term of this patent is extended or adjusted under 35 U.S.C. 154(b) by 442 days.

(21) Appl. No.: 17/325,759

(22) Filed: May 20, 2021

(65) Prior Publication Data
US 2022/0374653 A1    Nov. 24, 2022

(51) Int. Cl.
*G06F 18/214*    (2023.01)
*G06N 20/00*    (2019.01)
*G06T 3/00*    (2006.01)
*G06T 7/194*    (2017.01)
(Continued)

(52) U.S. Cl.
CPC ........... *G06F 18/214* (2023.01); *G06N 20/00* (2019.01); *G06T 3/00* (2013.01); *G06T 7/194* (2017.01);
(Continued)

(58) Field of Classification Search
CPC ......... G06F 18/214; G06N 20/00; G06T 3/00; G06T 7/194; G06T 2207/10016;
(Continued)

(56) References Cited

U.S. PATENT DOCUMENTS 6,993,462 B1 *    1/2006   Pavlovi .................. G06T 13/40
                                                              703/2
10,771,763 B2    9/2020   Zavesky et al.
(Continued)

FOREIGN PATENT DOCUMENTS

CN          109871781 A       6/2019

OTHER PUBLICATIONS

Ovhal et al. "Analysis of anomaly detection techniques in video surveillance." 2017 International Conference on Intelligent Sustainable Systems (ICISS). IEEE, 2017. (Year: 2017).*
(Continued)

*Primary Examiner* — Edward F Urban
*Assistant Examiner* — Benedict E Lee
(74) *Attorney, Agent, or Firm* — Jason C. Cameron

(57) ABSTRACT

A system and method for learning human activities from video demonstrations using video augmentation is disclosed. The method includes receiving original videos from one or more data sources. The method includes processing the received original videos using one or more video augmentation techniques to generate a set of augmented videos. Further, the method includes generating a set of training videos by combining the received original videos with the generated set of augmented videos. Also, the method includes generating a deep learning model for the received original videos based on the generated set of training videos. Further, the method includes learning the one or more human activities performed in the received original videos by deploying the generated deep learning model. The method includes outputting the learnt one or more human activities performed in the original videos.

22 Claims, 12 Drawing Sheets

(51) Int. Cl.
  *G06V 20/40* (2022.01)
  *G06V 40/20* (2022.01)
  *H04N 5/272* (2006.01)
  *H04N 7/01* (2006.01)
  *H04N 13/111* (2018.01)
(52) U.S. Cl.
  CPC .............. *G06V 20/41* (2022.01); *G06V 40/20* (2022.01); *H04N 5/272* (2013.01); *H04N 7/0127* (2013.01); *H04N 7/0135* (2013.01); *H04N 13/111* (2018.05); *G06T 2207/10016* (2013.01); *G06T 2207/20081* (2013.01)
(58) Field of Classification Search
  CPC .......... G06T 2207/20081; G06V 20/41; G06V 40/20; H04N 5/272; H04N 7/0127; H04N 7/0135; H04N 13/111
  See application file for complete search history.

(56) References Cited

U.S. PATENT DOCUMENTS

| | | | | |
|---|---|---|---|---|
| 10,861,213 | B1* | 12/2020 | Holzer | G06T 7/20 |
| 11,430,138 | B2* | 8/2022 | Chi | G06N 3/08 |
| 11,669,743 | B2* | 6/2023 | Quader | G06V 10/82 |
| | | | | 348/161 |
| 11,734,860 | B2* | 8/2023 | Millette | G06T 11/00 |
| | | | | 345/633 |
| 2020/0151458 | A1 | 5/2020 | Son et al. | |
| 2020/0337272 | A1 | 10/2020 | Kumar et al. | |
| 2022/0309289 | A1* | 9/2022 | Kawaski | G06F 18/2148 |
| 2022/0343525 | A1* | 10/2022 | Garg | G06T 7/593 |
| 2023/0196840 | A1* | 6/2023 | Murabayashi | G06T 7/0004 |
| | | | | 382/103 |
| 2023/0215160 | A1* | 7/2023 | Weinzaepfel | G06F 18/2431 |
| | | | | 382/157 |

OTHER PUBLICATIONS

Video-based similar gesture action recognition using deep learning and GAN-based approaches; Di Wu; Doctor of Philosophy; https://opus.lib.uts.edu.au/bitstream/10453/140177/2/02whole.pdf.

VideoMix: Rethinking Data Augmentation for Video Classification; Sangdoo Yun, Seong Joon Oh, Byeongho Heo, Dongyoon Han, Jinhyung Kim; arXiv:2012.03457v1 [cs.CV] Dec. 7, 2020; https://arxiv.org/pdf/2012.03457.pdf.

* cited by examiner

SYSTEM AND METHOD FOR LEARNING HUMAN ACTIVITIES FROM VIDEO DEMONSTRATIONS USING VIDEO AUGMENTATION

FIELD OF INVENTION

Embodiments of the present disclosure relate to video processing systems and more particularly to a system and a method for learning human activities from video demonstrations using video augmentation.

BACKGROUND

Human activity recognition is an essential task in processing systems as to it records people's behaviours with data that allows the processing systems to monitor, analyse, and assist their daily life. There are two categories of human activity recognition systems, one is video-based systems and the other is sensor-based systems. The video-based systems utilize cameras to capture images or videos to recognize people's behaviours. Sensor-based systems utilize on-body or ambient sensors to dead reckon people's motion details or log their activity tracks. In any case, human action recognition is a complex task in computer vision because of camera motion, occlusion, background cluttering, viewpoint variation, execution rate, and similar gestures. These challenges significantly degrade the performance of any human action recognition system.

In case of video-based systems, a large number of training videos are usually required for training a deep learning methods to perform human activity understanding tasks. To address this problem, many few-shot learning approaches have recently been proposed. However, such approaches often require a large dataset for meta-training and they have not been evaluated on tasks required understanding complex human activities. Some of the approaches using synthetic humans to improve the performance of human action recognition have recently been introduced. However, such approaches make use of synthetic 3D human models.

Hence, there is a need for an improved system and a method for learning human activities from video demonstrations using video augmentation in order to address the aforementioned issues.

SUMMARY

This summary is provided to introduce a selection of concepts, in a simple manner, which is further described in the detailed description of the disclosure. This summary is neither intended to identify key or essential inventive concepts of the subject matter nor to determine the scope of the disclosure.

In accordance with an embodiment of the present disclosure, a system for learning human activities from video demonstrations using video augmentation is disclosed. The system includes one or more hardware processors and a memory coupled to the one or more hardware processors. The memory includes plurality of subsystems in the form of programmable instructions executable by the one or more hardware processors. The plurality of subsystems includes a receiver subsystem configured for receiving one or more original videos from one or more data sources. The one or more original videos comprises one or more human activities. The plurality of subsystem further includes a video augmentation subsystem configured for processing the received one or more original videos using one or more video augmentation techniques to generate a set of augmented videos. Furthermore, the plurality of subsystem includes a training video generator subsystem configured for generating a set of training videos by combining the received one or more original videos with the generated set of augmented videos. Further, the plurality of subsystem includes a deep learning model generator subsystem configured for generating a deep learning model for the received one or more original videos based on the generated set of training videos. Also, the plurality of subsystem includes a learning subsystem configured for learning the one or more human activities performed in the received one or more original videos by deploying the generated deep learning model.

In accordance with another embodiment of the present disclosure, a method for learning human activities from video demonstrations using video augmentation is disclosed. The method includes receiving one or more original videos from one or more data sources. The one or more original videos comprises one or more human activities. The method further includes processing the received one or more original videos using one or more video augmentation techniques to generate a set of augmented videos. Further, the method includes generating a set of training videos by combining the received one or more original videos with the generated set of augmented videos. Additionally, the method includes generating a deep learning model for the received one or more original videos based on the generated set of training videos. Also, the method includes learning the one or more human activities performed in the received one or more original videos by deploying the generated deep learning model. Furthermore, the method includes outputting the learnt one or more human activities performed in the received one or more original videos on a user interface.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF DRAWINGS

The disclosure will be described and explained with additional specificity and detail with the accompanying figures in which.

Figure 1:
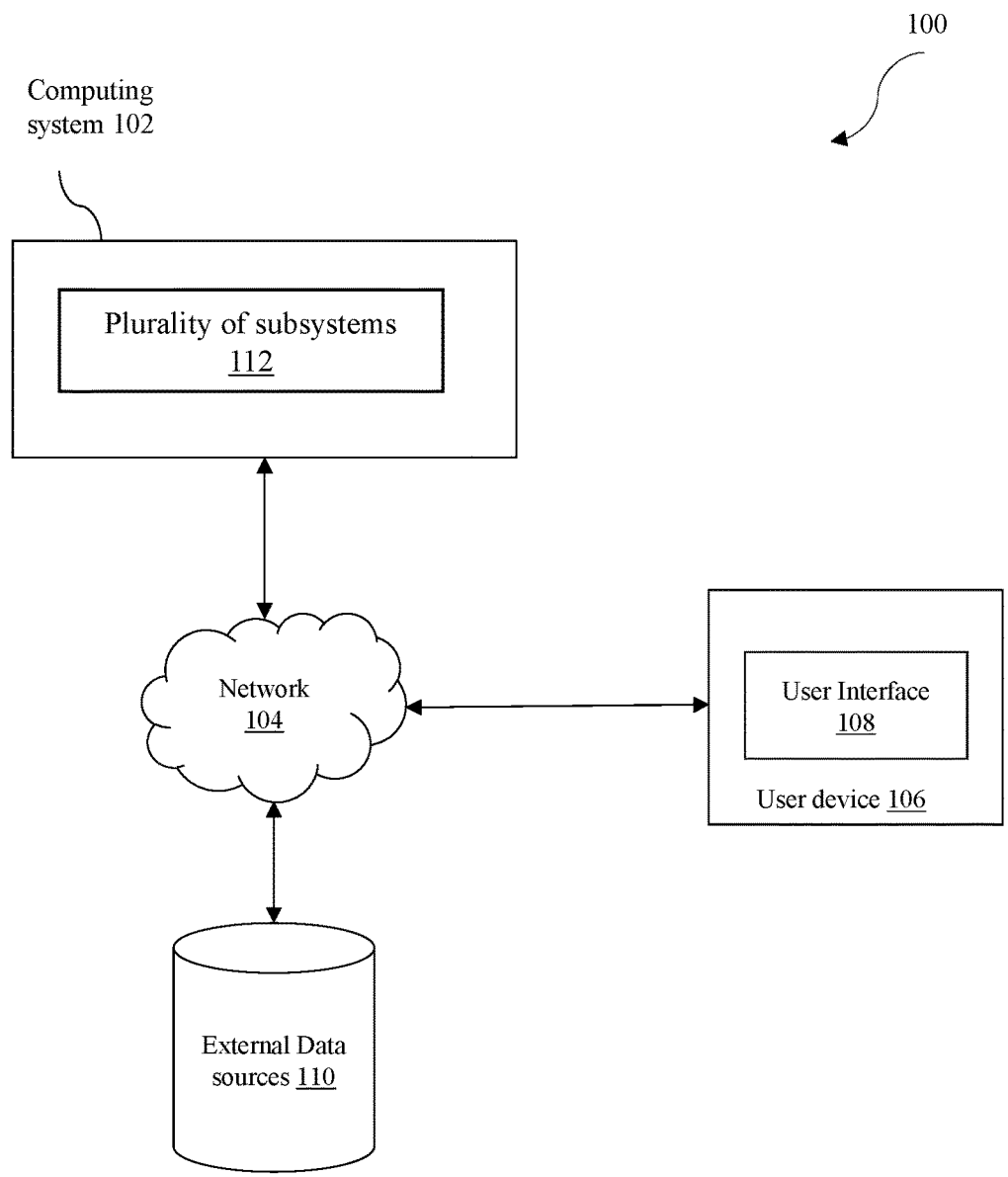
FIG. 1 is a block diagram illustrating an exemplary computing environment for learning human activities from video demonstrations using video augmentation, in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION OF THE DISCLOSURE

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure. It will be understood by those skilled in the art that the foregoing general description and the following detailed description are exemplary and explanatory of the disclosure and are not intended to be restrictive thereof.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

The terms "comprise", "comprising", or any other variations thereof, are intended to cover a non-exclusive inclusion, such that one or more devices or sub-systems or elements or structures or components preceded by "comprises . . . a" does not, without more constraints, preclude the existence of other devices, sub-systems, additional sub-modules. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

A computer system (standalone, client or server computer system) configured by an application may constitute a "module" (or "subsystem") that is configured and operated to perform certain operations. In one embodiment, the "module" or "subsystem" may be implemented mechanically or electronically, so a module may comprise dedicated circuitry or logic that is permanently configured (within a special-purpose processor) to perform certain operations. In another embodiment, a "module" or "subsystem" may also comprise programmable logic or circuitry (as encompassed within a general-purpose processor or other programmable processor) that is temporarily configured by software to perform certain operations.

Accordingly, the term "module" or "subsystem" should be understood to encompass a tangible entity, be that an entity that is physically constructed permanently configured (hardwired) or temporarily configured (programmed) to operate in a certain manner and/or to perform certain operations described herein.

Throughout this document, the terms browser and browser application may be used interchangeably to mean the same thing. In some aspects, the terms web application and web app may be used interchangeably to refer to an application, including metadata, that is installed in a browser application. In some aspects, the terms web application and web app may be used interchangeably to refer to a website and/or application to which access is provided over a network (e.g., the Internet) under a specific profile (e.g., a website that provides email service to a user under a specific profile). The terms extension application, web extension, web extension application, extension app and extension may be used interchangeably to refer to a bundle of files that are installed in the browser application to add functionality to the browser application. In some aspects, the term application, when used by itself without modifiers, may be used to refer to, but is not limited to, a web application and/or an extension application that is installed or is to be installed in the browser application.

Embodiments of the present disclosure disclose a system and method for learning human activities from video demonstrations using video augmentation. The system applies a novel combination of video augmentation methods such as image transformation, foreground synthesis, background synthesis, speed variation, motion variation, viewpoint variation, segment editing, and obfuscation rendering to generate a large number of augmented videos. The augmented videos are then combined with the original videos to form a large and diverse collection of training videos, which enables the utility of deep learning methods for human activity understanding tasks such as action classification, action segmentation, and anomaly detection, even when very few demonstration videos are available.

Referring now to the drawings, and more particularly to FIGS. 1 through 12, where similar reference characters denote corresponding features consistently throughout the figures, there are shown preferred embodiments and these embodiments are described in the context of the following exemplary system and/or method.

FIG. 1 is a block diagram illustrating an exemplary computing environment 100 for learning human activities from video demonstrations using video augmentation, in accordance with an embodiment of the present disclosure. According to FIG. 1, the computing environment 100 comprises a computing system 102 which is capable of learning human activities from video demonstrations using video augmentation. The video demonstrations are stored in external data sources 110. The computing system 102 is connected to the external data sources 110 via a network 104 (e.g., Internet). The computing system 102 is further connected to a user device 106 via the network 104 (e.g., Internet). In one specific embodiment, the one or more communication networks 104 may include, but not limited to, an internet connection, a wireless fidelity (WI-FI) and the like. Although, FIG. 1 illustrates the computing system 102 connected to one user device 106, one skilled in the art can envision that the computing system 102 can be connected to several user devices located at different locations via the network 104.

The user devices 106 can be a laptop computer, a desktop computer, a tablet computer, a smartphone and the like. The user device 106 can access software applications via a web browser. The user device 106 includes a user interface 108 for managing the software applications for learning human activities from video demonstrations using video augmentation. The software application may be a web application including one or more web pages.

The computing system 102 includes an interface, a server including hardware assets and an operating system (OS), a network interface, and application program interfaces (APIs). The interface enables communication between the server and the user device 106. As used herein, "computing environment" 100 refers to a processing environment comprising configurable computing physical and logical assets, for example, networks, servers, storage, applications, services, etc., and data distributed over the platform. The computing environment 100 provides on-demand network access to a shared pool of the configurable computing physical and logical assets. The server may include one or more servers on which the OS is installed. The servers may comprise one or more processors, one or more storage devices, such as, memory units, for storing data and machine-readable instructions for example, applications and application programming interfaces (APIs), and other peripherals required for providing cloud computing functionality. A detailed view of the computing system 102 is provided in FIG. 2.

The computing system 102 comprises a plurality of subsystems 112 configured for learning human activities from video demonstrations using video augmentation. In an embodiment, the computing system 102 is configured for receiving one or more original videos from one or more data sources 110. The one or more original videos comprises one or more human activities. The computing system 102 is configured for processing the received one or more original videos using one or more video augmentation techniques to generate a set of augmented videos. The computing system 102 is configured for generating a set of training videos by combining the received one or more original videos with the generated set of augmented videos. Further, the computing system 102 is configured for generating a deep learning model for the received one or more original videos based on the generated set of training videos. Also, the computing system 102 is configured for learning the one or more human activities performed in the received one or more original videos by deploying the generated deep learning model. Further, the computing system 102 is configured for outputting the learnt one or more human activities performed in the received one or more original videos on a user interface.

The external data sources 110 are external databases comprising one or more video data. For example, the external data sources 110 is configured to store the video data. In an exemplary embodiment, a user of the user device 106 captures a video data of a scene. The scene may include a human and an object. The human may interact with the object to perform a human activity. Therefore, the video data may include one or more human activities. The captured video data may then be stored on the local storage device of the user device 106 as well as uploaded to the external data sources 110. The external data sources 110 holds a record of such video data. Each of the captured video data comprises one or more video frames. The video data is then accessed by the computing system 102 via the network 104 for managing the video demonstrations.

In one alternate embodiment, the user device 106 may itself act as a computing system 102 capable of learning human activities from video demonstrations using video augmentation as described herein. In such embodiment, the user device 106 itself comprises the plurality of subsystems. Further, in such embodiment, the user device 106 interacts with the one or more external data sources 110 to access the video data.

Those of ordinary skilled in the art will appreciate that the hardware depicted in FIG. 1 may vary for particular implementations. For example, other peripheral devices such as an optical disk drive and the like, Local Area Network (LAN), Wide Area Network (WAN), Wireless (e.g., Wi-Fi) adapter, graphics adapter, disk controller, input/output (I/O) adapter also may be used in addition or in place of the hardware depicted. The depicted example is provided for the purpose of explanation only and is not meant to imply architectural limitations with respect to the present disclosure.

Those skilled in the art will recognize that, for simplicity and clarity, the full structure and operation of all data processing systems suitable for use with the present disclosure is not being depicted or described herein. Instead, only so much of a computing system 102 as is unique to the present disclosure or necessary for an understanding of the present disclosure is depicted and described. The remainder of the construction and operation of the computing system 102 may conform to any of the various current implementation and practices known in the art.

Figure 2:
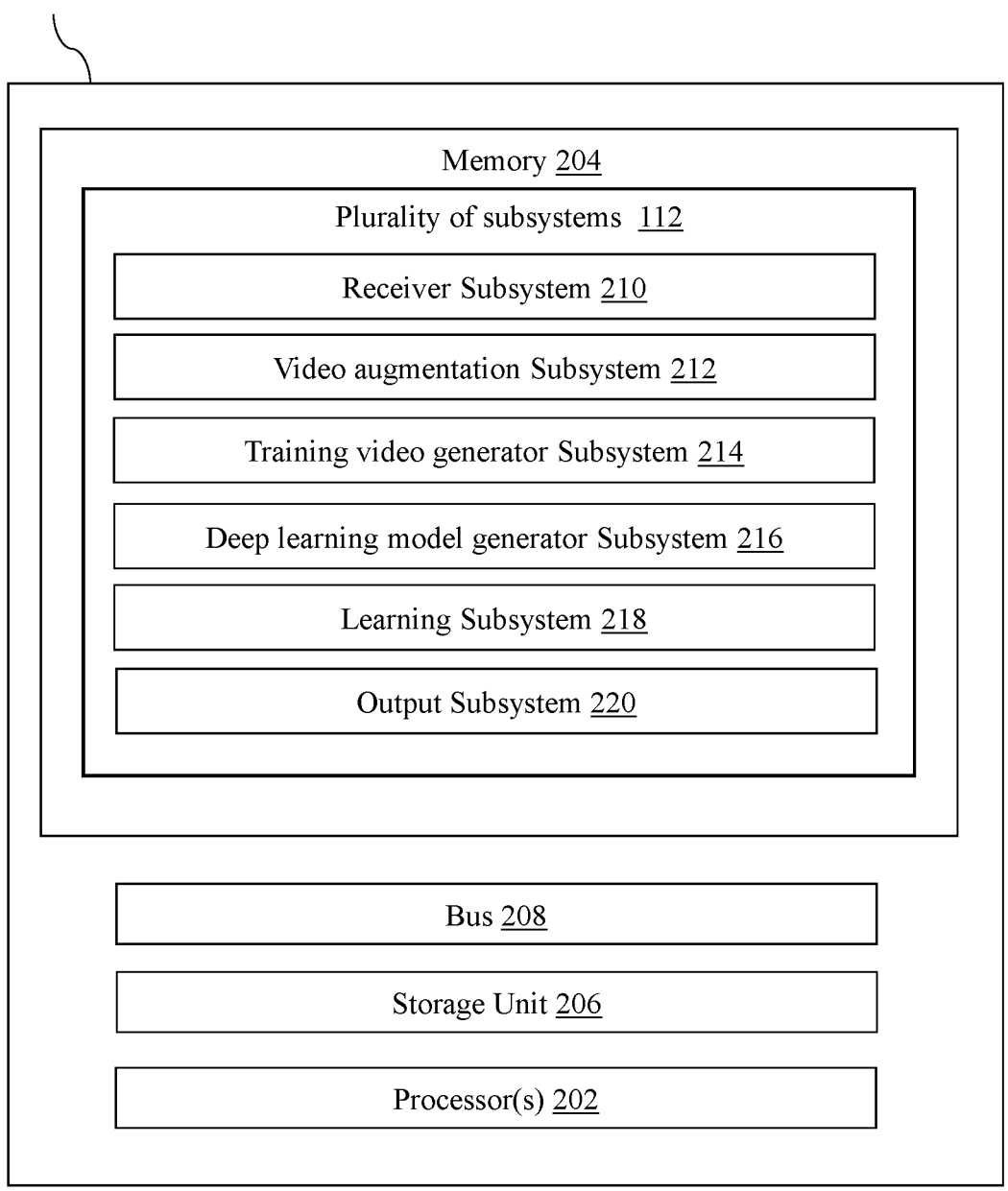
FIG. 2 is a block diagram illustrating an exemplary computing system, such as those shown in FIG. 1, capable of for learning human activities from video demonstrations using video augmentation, in accordance with an embodiment of the present disclosure.

FIG. 2 is a block diagram illustrating an exemplary computing system 102, such as those shown in FIG. 1, capable of for learning human activities from video demonstrations using video augmentation, in accordance with an embodiment of the present disclosure. In FIG. 2, the computing system 102 comprises a processor 202, a memory 204, and a storage unit 206. The processor 202, the memory 204 and the storage unit 206 are communicatively coupled through a system bus 208 or any similar mechanism. The memory 204 comprises a plurality of subsystems 112 (such as those shown in FIG. 1) in the form of programmable instructions executable by the one or more processors 202. The plurality of subsystems 112 further includes a receiver subsystem 210, a video augmentation subsystem 212, a training video generator subsystem 214, a deep learning model generator subsystem 216, a learning subsystem 218 and an output subsystem 220.

The processor(s) 202, as used herein, means any type of computational circuit, such as, but not limited to, a microprocessor unit, microcontroller, complex instruction set computing microprocessor unit, reduced instruction set computing microprocessor unit, very long instruction word microprocessor unit, explicitly parallel instruction computing microprocessor unit, graphics processing unit, digital signal processing unit, or any other type of processing circuit. The processor(s) 202 may also include embedded controllers, such as generic or programmable logic devices or arrays, application specific integrated circuits, single-chip computers, and the like. The computing system 102 may be a cloud computing system or a remote server.

The memory 204 may be non-transitory volatile memory and non-volatile memory. The memory 204 may be coupled for communication with the processor(s) 202, such as being a computer-readable storage medium. The processor(s) 202 may execute machine-readable instructions and/or source code stored in the memory 204. A variety of machine-readable instructions may be stored in and accessed from the memory 204. The memory 204 may include any suitable elements for storing data and machine-readable instructions, such as read only memory, random access memory, erasable programmable read only memory, electrically erasable programmable read only memory, a hard drive, a removable media drive for handling compact disks, digital video disks, diskettes, magnetic tape cartridges, memory cards, and the like. In the present embodiment, the memory 204 includes a plurality of subsystems 112 stored in the form of machine-readable instructions on any of the above-mentioned storage media and may be in communication with and executed by the processor(s) 202.

The receiver subsystem 210 is configured for receiving one or more original videos from the one or more data sources 110. The one or more original videos comprises one or more human activities. Each of the one or more original videos comprises a complete scene or a part of the scene captured.

The video augmentation subsystem 212 is configured for processing the received one or more original videos using one or more video augmentation techniques to generate a set of augmented videos. The one or more video augmentation techniques comprises the one or more video augmentation techniques comprises performing one or more image transformation configurations to the received one or more original videos and generating the set of augmented videos upon performing the one or more image transformation configurations to the received one or more original videos. Further, the one or more video augmentation techniques comprises splitting foreground and background images from the received one or more original videos, generating an updated foreground image for the received one or more original videos; and overlaying the updated foreground image on top of the background image to generate the set of augmented videos. The generated set of augmented videos comprises diverse foreground images. Furthermore, the one or more video augmentation techniques comprises splitting foreground and background images from the received one or more original videos, generating a random background image for the received one or more original videos; and overlaying the random background image on top of the foreground image to generate the set of augmented videos, wherein the generated set of augmented videos comprises diverse foregrounds.

Further, the one or more video augmentation techniques comprises performing at least one of a frame sampling and a frame interpolation method to the received one or more original videos; and generating the set of augmented videos upon performing the one or more image transformation configurations to the received one or more original videos. Furthermore, the plurality of subsystems 112 comprises a frame rate handler subsystem configured for determining whether the received one or more original videos comprises high frame rate. Further, the frame rate handler subsystem is configured for down sampling the received one or more original videos to generate the set of augmented videos if the received one or more original videos comprises high frame rate.

Furthermore, the one or more video augmentation techniques comprises modifying human motion in the received one or more original videos; modifying object location corresponding to the modified human motion in the received one or more original videos to generate a modified image; and performing interpolation on the modified image to generate the set of augmented videos. Also, the one or more video augmentation techniques comprises reconstructing one or more three dimensional scenes from the received one or more original videos; generating a random viewpoint for the received one or more original videos using a three dimensional view of the one or more original videos; reprojecting the reconstructed one or more three dimensional scenes with the generated random viewpoint to generate a reprojected image; and performing interpolation on the generated reprojected image to generate the set of augmented videos.

Also, the one or more video augmentation techniques comprises modifying segments of the received one or more original videos comprising the one or more human activities; and performing frame interpolation on the modified segments of the received one or more original videos to generate the set of augmented videos. Further, the one or more video augmentation techniques comprises applying random obfuscations on the received one or more original videos to generate the set of augmented videos.

The training video generator subsystem 214 configured for generating a set of training videos by combining the received one or more original videos with the generated set of augmented videos.

The deep learning model generator subsystem 216 configured for generating a deep learning model for the received one or more original videos based on the generated set of training videos. In generating the deep learning model for the received one or more original videos based on the generated set of training videos, the deep learning model generator subsystem 216 is configured for learning one or more actions associated with the one or more human activities performed in the training videos. Further, the deep learning model generator subsystem 216 is configured for classifying the learnt one or more actions into one or more action categories. Also, the deep learning model generator subsystem 216 is configured for detecting one or more anomalies in the classified one or more actions. Further, the deep learning model generator subsystem 216 is configured for generating the deep learning model for the received one or more original videos based on the detected one or more anomalies.

The learning subsystem 218 is configured for learning the one or more human activities performed in the received one or more original videos by deploying the generated deep learning model.

The output subsystem 220 is configured for outputting the learnt one or more human activities performed in the received one or more original videos on a user interface.

The storage unit 206 stores the information relating to the original videos and other related information. The storage unit 206 is, for example, a structured query language (SQL) data store. The storage unit 206 is configured as cloud-based database implemented in the computing environment 100, where software application are delivered as a service over a cloud platform. The storage unit 206, according to another embodiment of the present disclosure, is a location on a file system directly accessible by the plurality of subsystems 112. The storage unit 206 is configured to store the original videos, augmented videos, human activities deep learning model, and the like.

Figure 3:
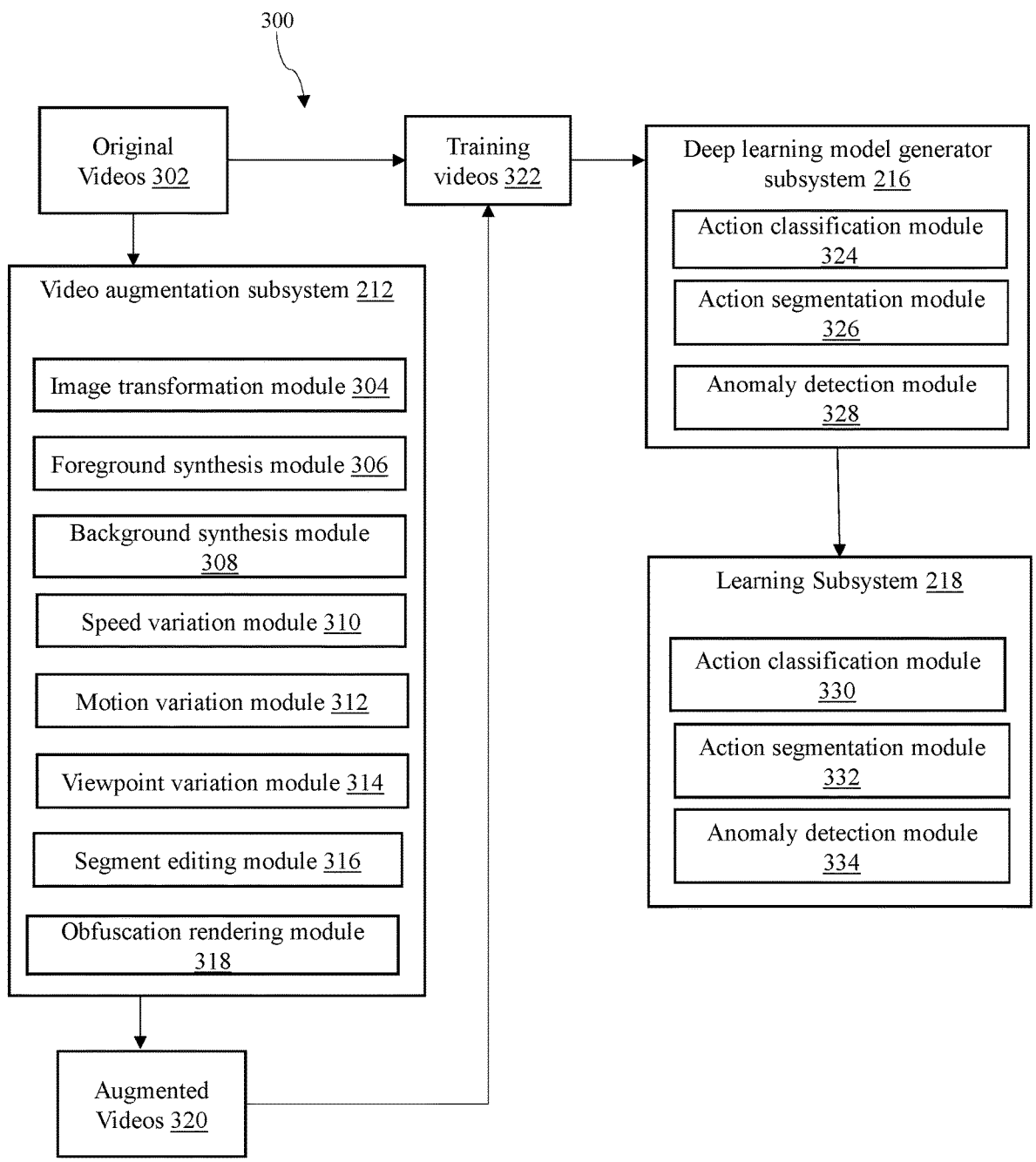
FIG. 3 is a block diagram illustrating various components of the computing system capable of learning human activities from video demonstrations using video augmentation, in accordance with an embodiment of the present disclosure.

FIG. 3 is a block diagram illustrating various components of the computing system 102 capable of learning human activities from video demonstrations using video augmentation, in accordance with an embodiment of the present disclosure. According to FIG. 3, one or more original videos 302 are inputted to the video augmentation subsystem 212. The video augmentation subsystem 212 comprises an image transformation module 304, a foreground synthesis module 306, a background synthesis module 308, a speed variation module 310, a motion variation module 312, a viewpoint variation module 314, a segment editing module 316, and an obfuscation rendering module 318. Each of these modules within the video augmentation subsystem 212 perform task independently of each other to produce the augmented videos 320. Detailed working of each of the modules are illustrated from FIG. 4 to FIG. 11. The input for each of these modules is original videos 302. Further, the outputted augmented videos 320 is combined with original videos 302 to generate a set of training videos 322. This step produces a large and diverse collection of training videos 322. Further, the training videos 322 are fed to the deep learning model generator subsystem 216 to generate a deep learning model. This set of training videos 322 allows the training of deep learning methods for human activity understanding tasks such as action classification, action segmentation, and anomaly detection, even when very few demonstration videos are provided. This is achieved through the action classification module 324, the action segmentation module 326, and anomaly detection module 328. The action classification module 324 analyses the training videos 322 and classifies them based on type of action performed in the video. For example, if a human performs an action of lifting a hand, running on the road or any other action, then the action classification module 324 classifies the video based on type of actions. Further, the action segmentation module 326 segments the video into different segments comprising parts of video frames based on the type of action classified.

Further, the anomaly detection module 328 detects if there are any anomalies in the videos. Later, the deep learning model is deployed into the learning subsystem 218 for understanding the one or more human activities. The learning subsystem 218 comprises action classification module 330, action segmentation module 332, and the anomaly detection module 334. The learning subsystem 218 uses these modules to infer a set of test videos.

Figure 4:
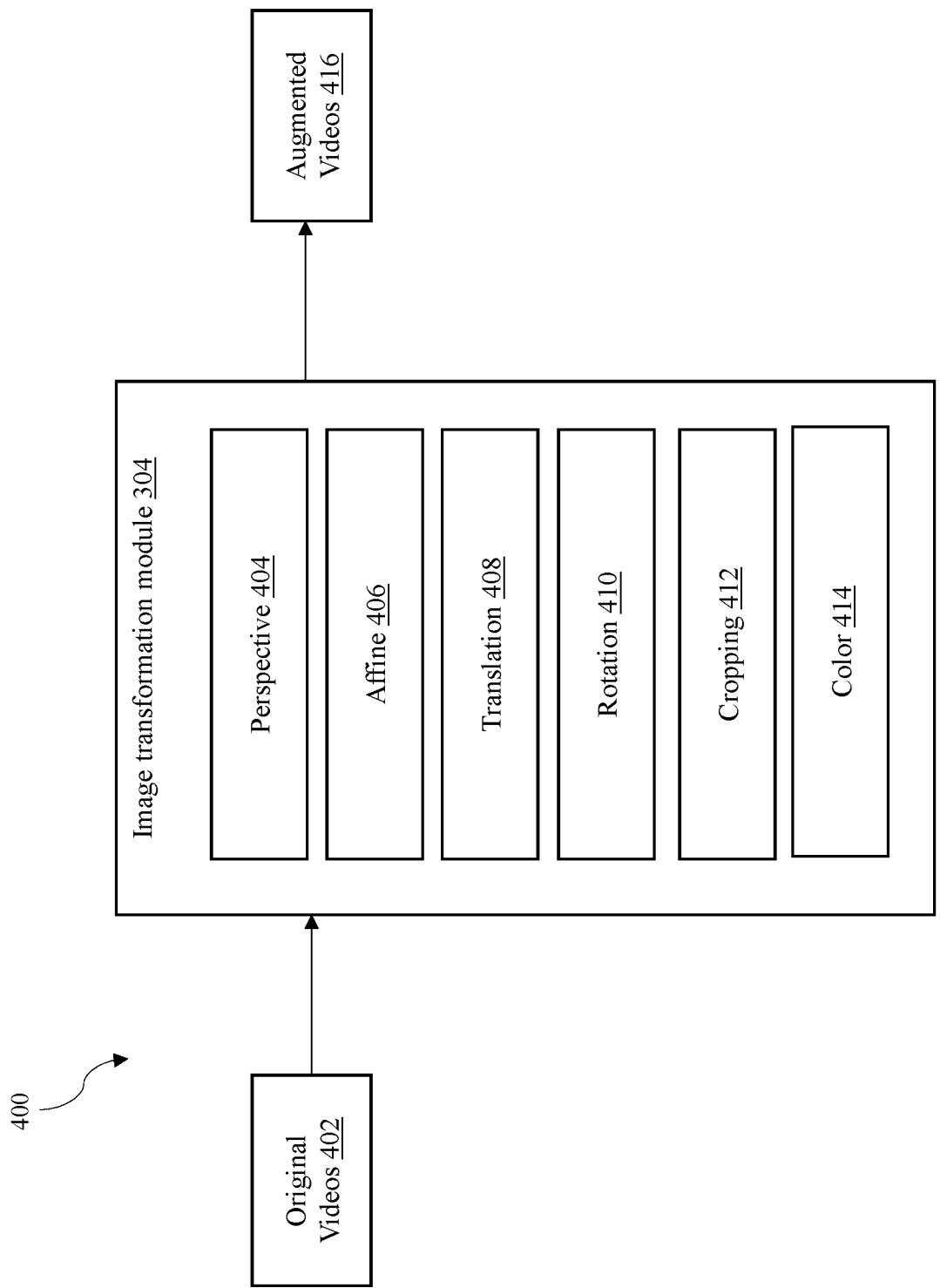
FIG. 4 is a block diagram illustrating various components of the image transformation module capable of processing the received one or more original videos using one or more video augmentation techniques to generate a set of augmented videos in accordance with an embodiment of the present disclosure.

FIG. 4 is a block diagram illustrating various components of the image transformation module 304 capable of processing the received one or more original videos using one or more video augmentation techniques to generate a set of augmented videos in accordance with an embodiment of the present disclosure. In FIG. 4, the original videos 402 received from the external data sources 110 are fed to the image transformation module 304. The image transformation module 304 is configured for processing the received one or more original videos 402 using image transformation module 304 to generate the set of augmented videos 416. The image transformation module 304 is configured for performing one or more image transformation configurations to the received one or more original videos 402 and generating the set of augmented videos 416 upon performing the one or more image transformation configurations to the received one or more original videos 402. The one or more image transformation configurations comprises perspective distortion 404, affine distortion 406, translation 408, rotation 410, cropping 412, and color jittering 414. Each of these configurations modifies the original videos 402 to produce the augmented videos 416. These configurations add more variations to camera intrinsic (e.g., principal point), camera extrinsic (e.g., viewpoint), and illumination (e.g., color).

Figure 5:
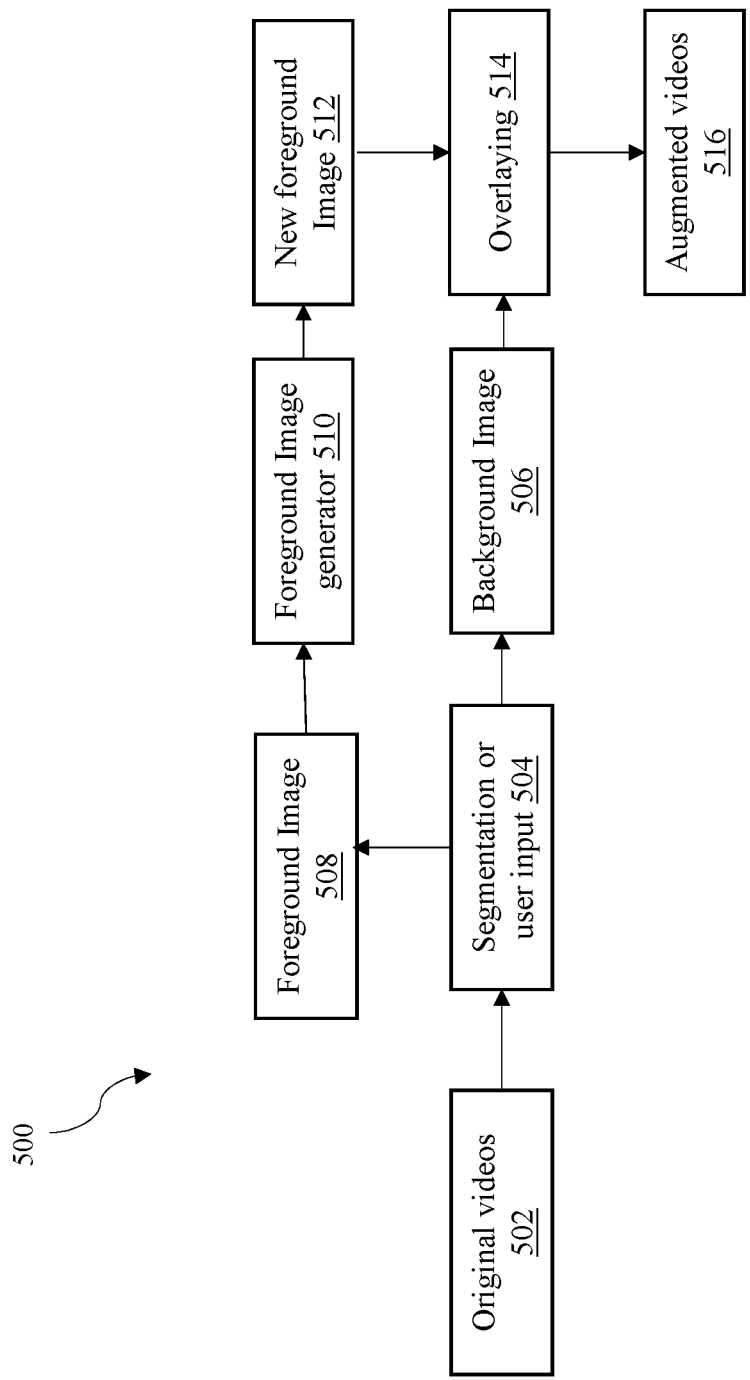
FIG. 5 is a block diagram illustrating various components of the foreground synthesis module capable of processing the received one or more original videos using one or more video augmentation techniques to generate a set of augmented videos in accordance with an embodiment of the present disclosure.

FIG. 5 is a block diagram illustrating various components of the foreground synthesis module 306 capable of processing the received one or more original videos using one or more video augmentation techniques to generate a set of augmented videos in accordance with an embodiment of the present disclosure. The foreground synthesis module 306 is configured for splitting foreground and background images from the received one or more original videos 502; generating an updated foreground image 512 for the received one or more original videos 502; and overlaying the updated foreground image 512 on top of the background image 506 to generate the set of augmented videos 516. The generated set of augmented videos 516 comprises diverse foreground images. The original videos 502 are fed to a segmentation module or user input module 504. The segmentation module or user input module 504 segments the original videos 502 into foreground image 508 and background image 506. For example, the foreground image 508 may include both humans and objects. Alternatively, the segmentation module 504 may be bypassed if the segmentation masks are provided by the users via a Graphical User Interface (GUI). The foreground image 508 is then fed to the foreground image generator 510 to produce new foreground image 512. For example, human appearance can be replaced with a random human appearance. This new foreground image 512 is fed along with the background image 506 to the overlaying module 514. The overlaying module 514 overlays the new foreground image 512 and the background image 506 to produce the augmented videos 516. Additionally, blending techniques, e.g., Poisson blending, may be applied to smooth out boundaries between the foreground image and the background image. By following the above steps, a large number of augmented videos 516 with diverse foregrounds are generated.

Figure 6:
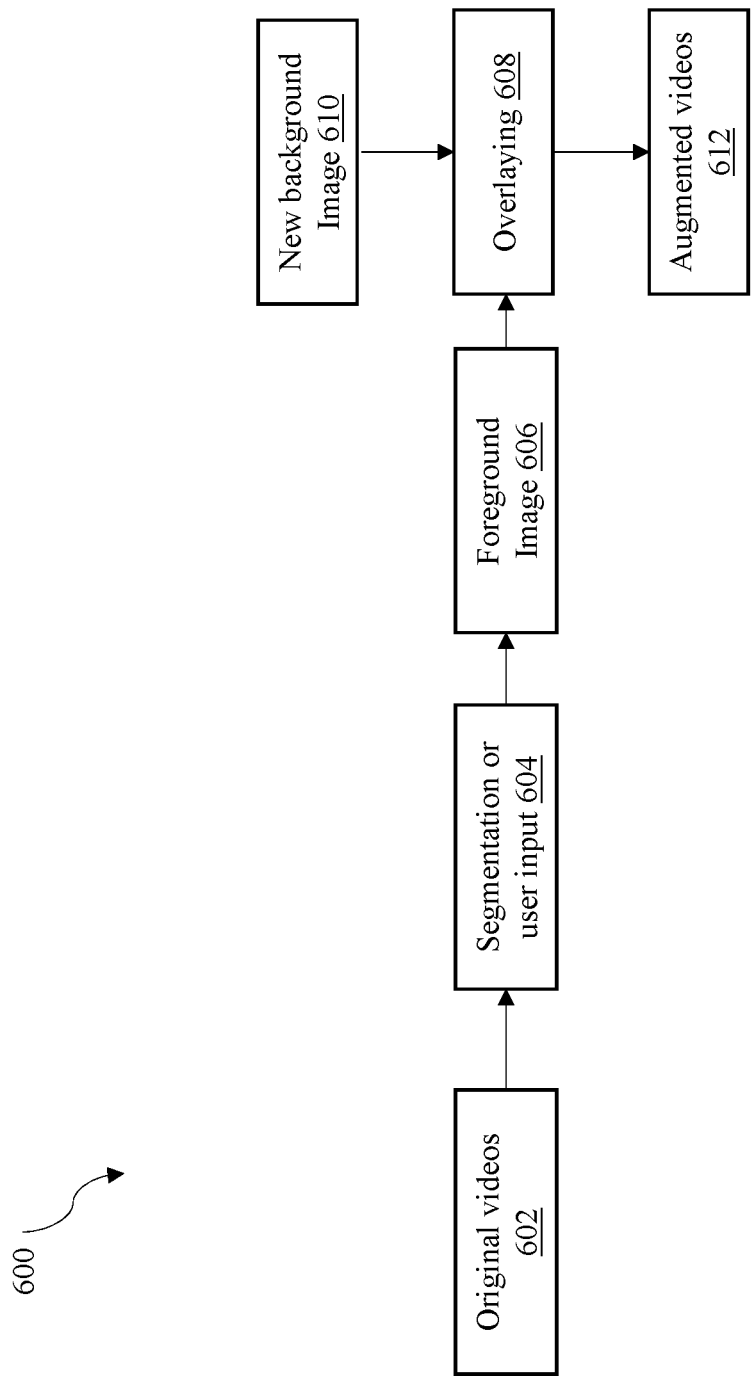
FIG. 6 is a block diagram illustrating various components of the background synthesis module capable of processing the received one or more original videos using one or more video augmentation techniques to generate a set of augmented videos in accordance with an embodiment of the present disclosure.

FIG. 6 is a block diagram illustrating various components of the background synthesis module 308 capable of processing the received one or more original videos using one or more video augmentation techniques to generate a set of augmented videos in accordance with an embodiment of the present disclosure. The background synthesis module 308 is configured for splitting foreground and background images from the received one or more original videos 602; generating a random background image 610 for the received one or more original videos 602; and overlaying the random background image 610 on top of the foreground image 606 to generate the set of augmented videos 612. The generated set of augmented videos 612 comprises diverse foregrounds. The original videos 602 are fed to segmentation or user input module 604. The segmentation or user input module 604 segments the original videos 602 into foreground image 606 and background image. For example, the foreground image 606 may include both humans and objects. Alternatively, the segmentation or user input module 604 may be bypassed if the segmentation masks are provided by the users via a Graphical User Interface (GUI). The foreground image 606 is overlayed with a new background image 610 at the overlaying module 608. The old background image is then discarded. This step generates the augmented videos 612. Additionally, blending techniques, e.g., Poisson blending, may be applied to smooth out the boundaries between foreground image 606 and the background image. By following the above steps, a large number of augmented videos 612 are generated with diverse backgrounds.

Figure 7:
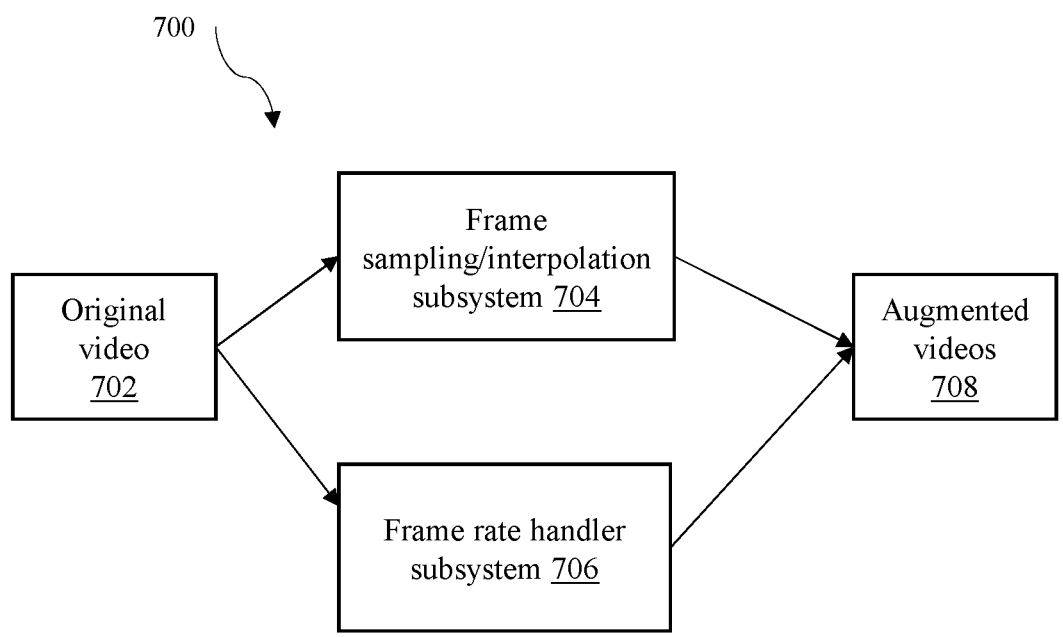
FIG. 7 is a block diagram illustrating various components of the speed variation module capable of processing the received one or more original videos using one or more video augmentation techniques to generate a set of augmented videos in accordance with an embodiment of the present disclosure.

FIG. 7 is a block diagram illustrating various components of the speed variation module 310 capable of processing the received one or more original videos using one or more video augmentation techniques to generate a set of augmented videos in accordance with an embodiment of the present disclosure. The speed variation module 310 is configured for performing at least one of a frame sampling and a frame interpolation method to the received one or more original videos 702; and generating the set of augmented videos 708 upon performing the at least one of a frame sampling and a frame interpolation method to the received one or more original videos 702. The original videos 702 are fed to frame sampling or frame interpolation subsystem 704 to generate the augmented videos 708. Further, the speed variation module 310 comprises a frame rate handler subsystem 706 configured for determining whether the received one or more original videos 702 comprises high frame rate and down sampling the received one or more original videos 702 to generate the set of augmented videos 708 if the received one or more original videos 702 comprises high frame rate. In an exemplary embodiment, since different people in the videos may perform same human activity at different speeds or the same person may perform the same human activity at different speeds at different times, the human activity may be "speed up" and "slow down" in the few original videos 702 by conducting frame sampling and frame interpolation method. Alternatively, if camera captures the original videos 702 at a very high frame rate (e.g., 100 frames per second or FPS), the original videos 702 may be directly down-sampled to various frame rates (e.g., 50 FPS, 30 FPS, 10 FPS, 5 FPS), including the frame rate that are deploy at test time (typically 10 FPS for real-time performance), and bypass the above frame sampling/frame interpolation subsystem 704. The above steps generate a large number of augmented videos 708 with diverse speeds.

Figure 8:
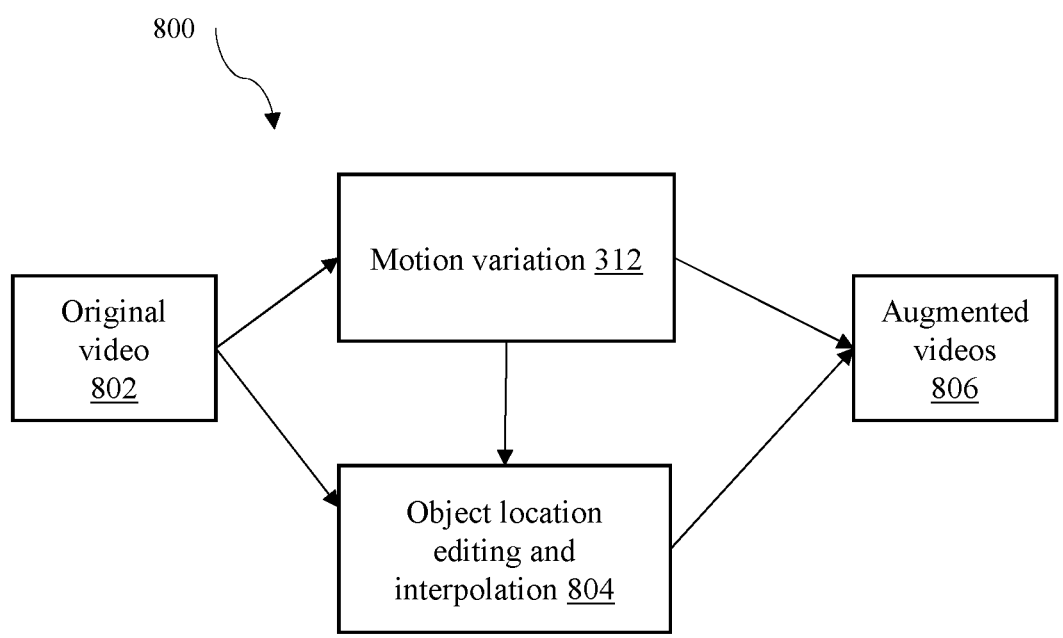
FIG. 8 is a block diagram illustrating various components of the motion variation module capable of processing the received one or more original videos using one or more video augmentation techniques to generate a set of augmented videos in accordance with an embodiment of the present disclosure.

FIG. 8 is a block diagram illustrating various components of the motion variation module 312 capable of processing the received one or more original videos using one or more video augmentation techniques to generate a set of augmented videos in accordance with an embodiment of the present disclosure. The motion variation module 312 is configured for modifying human motion in the received one or more original videos 802; modifying object location corresponding to the modified human motion in the received one or more original videos 802 to generate a modified image; and performing interpolation on the modified image to generate the set of augmented videos 806. Variations to human motions may be added to the original videos 802 and object locations are adapted accordingly, e.g., by removing objects, placing objects accordingly, and an interpolation may be performed. The original videos 802 are fed to the motion variation subsystem 312 to modify human motion. Simultaneously, the object location and editing and interpolation module 804 modifies the object location corresponding to the modified human motion. The output of these two subsystems are combined to produce the augmented videos 806. The above steps generate a large number of augmented videos 806 with diverse motions.

Figure 9:
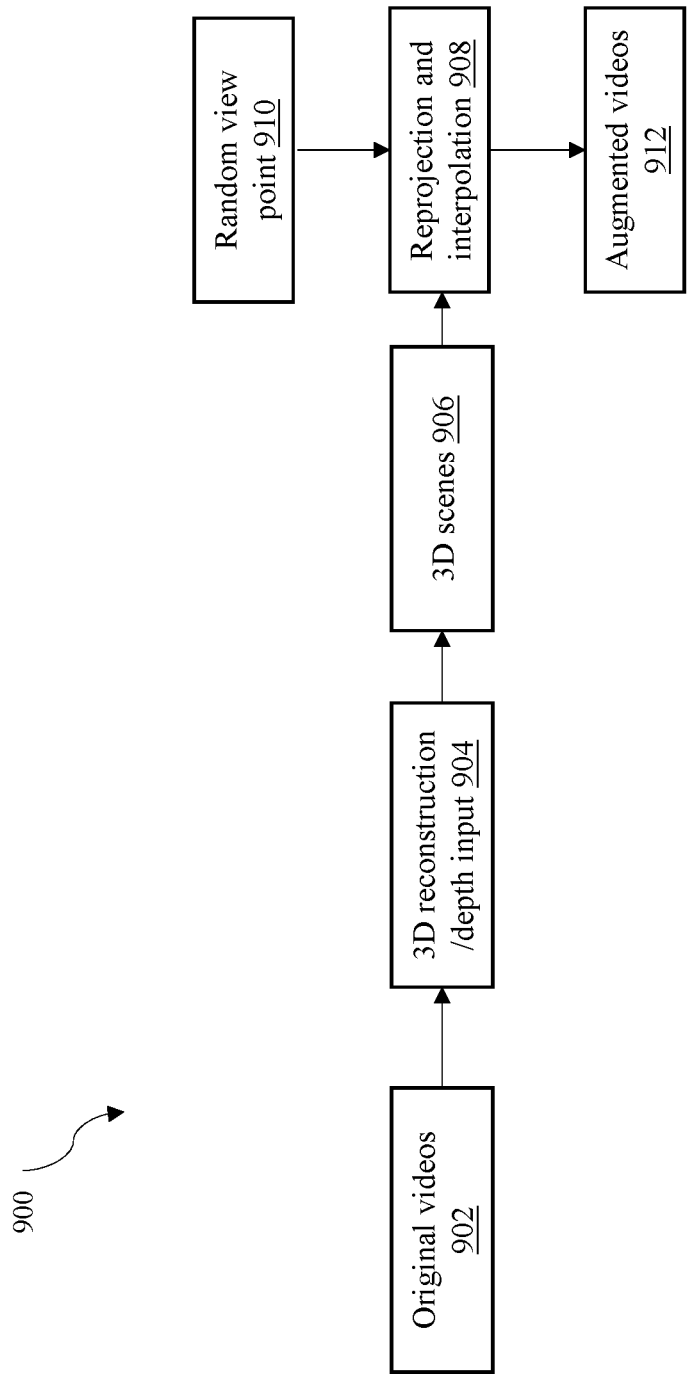
FIG. 9 is a block diagram illustrating various components of the viewpoint variation module capable of processing the received one or more original videos using one or more video augmentation techniques to generate a set of augmented videos in accordance with an embodiment of the present disclosure.

FIG. 9 is a block diagram illustrating various components of the viewpoint variation module 314 capable of processing the received one or more original videos using one or more video augmentation techniques to generate a set of augmented videos in accordance with an embodiment of the present disclosure. The viewpoint variation module 314 is configured for reconstructing one or more three dimensional (3D) scenes 906 from the received one or more original videos 902; generating a random viewpoint 910 for the received one or more original videos 902 using a three dimensional view of the one or more original videos 902; reprojecting the reconstructed one or more three dimensional scenes 906 with the generated random viewpoint 910 to generate a reprojected image; and performing interpolation on the generated reprojected image to generate the set of augmented videos 912. The original videos 901 is fed to a three-dimensional (3D) reconstruction subsystem or depth input 904 to generate the 3D scenes 906. The 3D scenes 906 are fed to the reprojection and interpolation subsystem 908 along with the random viewpoint 910 to produce the augmented videos 912. The augmented videos 912 are generated with different viewpoints, e.g., by reprojecting the 3D scenes 906 with different viewpoints to the image planes and performing interpolation to fill in the holes in the images. Alternatively, if depth sensor is available, depth information may be directly used from the depth sensor, and the 3D reconstruction subsystem 904 may be bypassed.

Figure 10:
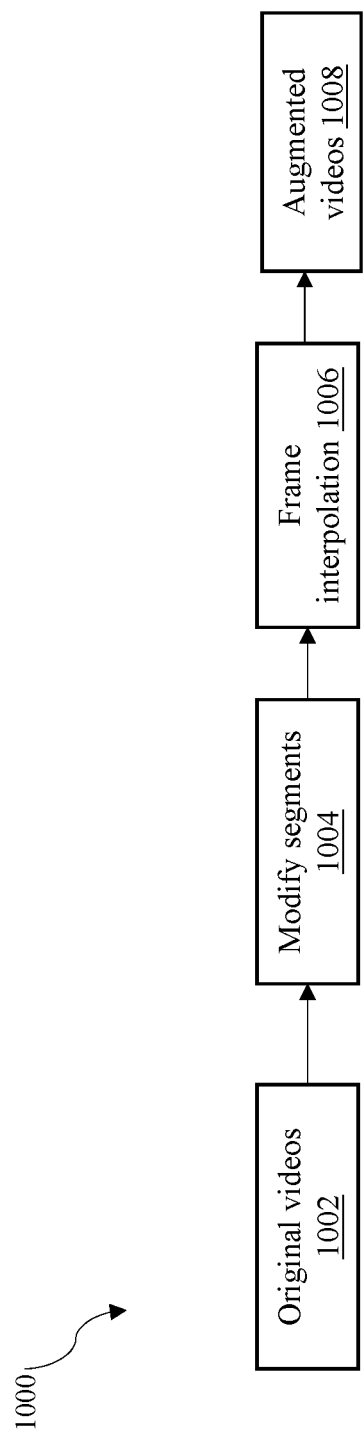
FIG. 10 is a block diagram illustrating various components of the segment editing module capable of processing the received one or more original videos using one or more video augmentation techniques to generate a set of augmented videos in accordance with an embodiment of the present disclosure.

FIG. 10 is a block diagram illustrating various components of the segment editing module 316 capable of processing the received one or more original videos using one or more video augmentation techniques to generate a set of augmented videos in accordance with an embodiment of the present disclosure. The segment editing module 316 is configured for modifying segments of the received one or more original videos 1002 comprising the one or more human activities; and performing frame interpolation on the modified segments of the received one or more original videos 1002 to generate the set of augmented videos 1008. The original videos 1002 are fed to segment modification subsystem to modify segments 1004 of the original videos 1002. These modified segments are then fed to frame interpolation subsystem 1006 to generate the augmented videos 1008. The modifications may be for example, delete, add, and permute segments of the human activity occurred in the original videos 1002 to generate a large number of augmented videos 1008. For example, a segment may be deleted, a segment may be added, and two segments may be permuted, and then frame interpolation may be performed to smooth out boundary frames.

Figure 11:
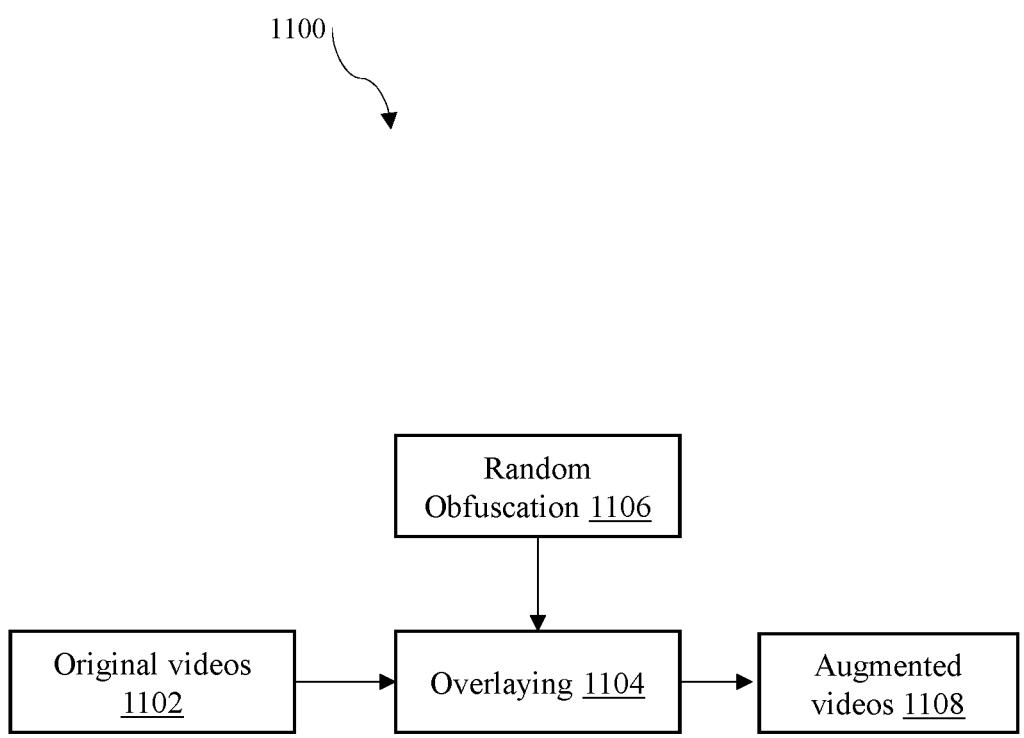
FIG. 11 is a block diagram illustrating various components of the obfuscation rendering module capable of processing the received one or more original videos using one or more video augmentation techniques to generate a set of augmented videos in accordance with an embodiment of the present disclosure.

FIG. 11 is a block diagram illustrating various components of the obfuscation rendering module 318 capable of processing the received one or more original videos using one or more video augmentation techniques to generate a set of augmented videos in accordance with an embodiment of the present disclosure. The obfuscation rendering module 318 is configured for applying random obfuscations on the received one or more original videos 1102 to generate the set of augmented videos 1108. The original videos 1102 are fed along with the random obfuscation 1106 to the overlaying subsystem 1104 to produce the augmented videos 1108. Obfuscations such as blurs and empty or black patches may be randomly rendered on top of the video frames to generate a large number of augmented videos 1108. These obfuscations prevent the deep learning methods to focus only on specific or local regions of the video frames and force them to look at all regions of the video frames.

Figure 12:
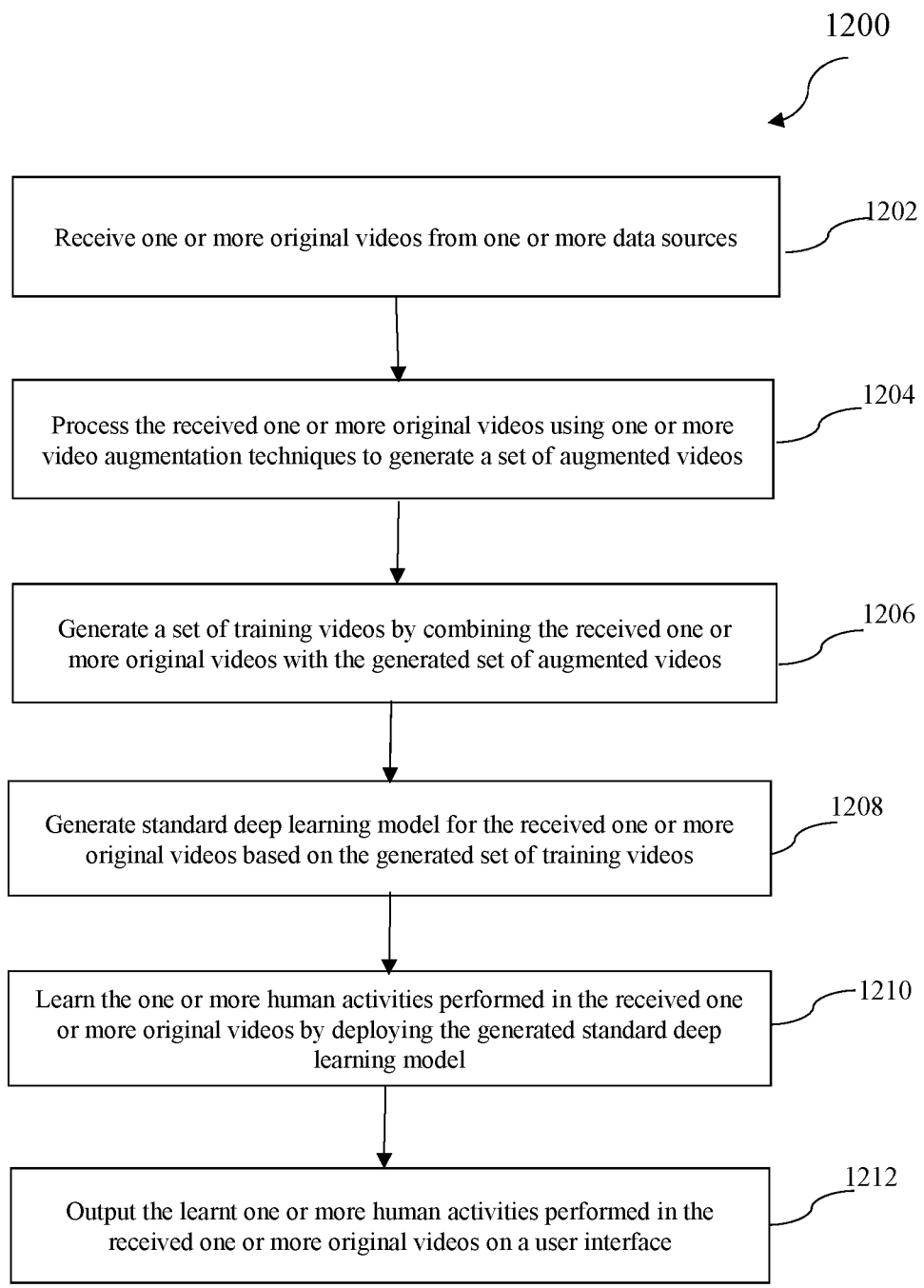
FIG. 12 is a process flow diagram illustrating an exemplary method for learning human activities from video demonstrations using video augmentation in accordance with an embodiment of the present disclosure.

FIG. 12 is a process flow diagram illustrating an exemplary method 1200 for learning human activities from video demonstrations using video augmentation in accordance with an embodiment of the present disclosure. At step 1202, one or more original videos are received from one or more data sources 110. The one or more original videos comprises one or more human activities. At step 1204, the received one or more original videos are processed using one or more video augmentation techniques to generate a set of augmented videos. At step 1206, a set of training videos are generated by combining the received one or more original videos with the generated set of augmented videos. At step 1208, a deep learning model is generated for the received one or more original videos based on the generated set of training videos. At step 1210, the one or more human activities performed in the received one or more original videos are learnt by deploying the generated deep learning model. At step 1212, the learnt one or more human activities performed in the received one or more original videos are outputted on a user interface.

In an embodiment, the one or more video augmentation techniques includes performing one or more image transformation configurations to the received one or more original videos; and generating the set of augmented videos upon performing the one or more image transformation configurations to the received one or more original videos.

Further, the one or more video augmentation techniques includes splitting foreground and background images from the received one or more original videos; generating an updated foreground image for the received one or more original videos; and overlaying the updated foreground image on top of the background image to generate the set of augmented videos, wherein the generated set of augmented videos comprises diverse foreground images.

Furthermore, the one or more video augmentation techniques includes splitting foreground and background images from the received one or more original videos; generating a random background image for the received one or more original videos; and overlaying the random background image on top of the foreground image to generate the set of augmented videos, wherein the generated set of augmented videos comprises diverse foregrounds.

Also, the one or more video augmentation techniques includes performing at least one of a frame sampling and a frame interpolation method to the received one or more original videos; and generating the set of augmented videos upon performing the at least one of a frame sampling and a frame interpolation method to the received one or more original videos.

The method 1200 further includes determining whether the received one or more original videos comprises high frame rate; and down sampling the received one or more original videos to generate the set of augmented videos if the received one or more original videos comprises high frame rate.

Furthermore, the one or more video augmentation techniques includes modifying human motion in the received one or more original videos; modifying object location corresponding to the modified human motion in the received one or more original videos to generate a modified image; and performing interpolation on the modified image to generate the set of augmented videos.

Also, the one or more video augmentation techniques includes reconstructing one or more three dimensional scenes from the received one or more original videos; generating a random viewpoint for the received one or more original videos using a three dimensional view of the one or more original videos; reprojecting the reconstructed one or more three dimensional scenes with the generated random viewpoint to generate a reprojected image; and performing interpolation on the generated reprojected image to generate the set of augmented videos.

The one or more video augmentation techniques further includes modifying segments of the received one or more original videos comprising the one or more human activities; and performing frame interpolation on the modified segments of the received one or more original videos to generate the set of augmented videos.

The one or more video augmentation techniques further includes applying random obfuscations on the received one or more original videos to generate the set of augmented videos.

In generating the deep learning model for the received one or more original videos based on the generated set of training videos, the method includes learning one or more actions associated with the one or more human activities performed in the training videos. The method further includes classifying the learnt one or more actions into one or more action categories. Further, the method includes detecting one or more anomalies in the classified one or more actions. Further, the method includes generating the deep learning model for the received one or more original videos based on the detected one or more anomalies.

Various embodiments of the present system provide a technical solution to the problem of few-shot learning of human activities. The present system provides a system and method for learning human activities from few demonstration videos by leveraging video augmentation techniques. In particular, given the few original videos provided, the present system applies a novel combination of video augmentation methods such as image transformation, foreground synthesis, background synthesis, speed variation, motion variation, viewpoint variation, segment editing, and obfuscation rendering to generate a large number of augmented videos. The augmented videos are then combined with the original videos to form a large and diverse collection of training videos, which enables the utility of deep learning methods for human activity understanding tasks such as action classification, action segmentation, and anomaly detection, even when very few demonstration videos are available.

Further, the present system provides a new few-shot approach for learning human activities by leveraging video augmentation, which does not need the meta-training phase and is capable of handling complex human activities.

The present system focuses on combining and adapting these specific tools to enlarge and add variations to training data, which enables the utility of deep learning methods.

Furthermore, a few conventional approaches using synthetic humans to improve the performance of human action recognition have recently been introduced. However, these approaches make use of synthetic 3D human models, whereas the present system follow a 2D approach to synthesize the human appearance. In addition, the conventional approaches only work with activities involving humans only, while the present system handles activities capturing humans, objects, and their interactions.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-R/W) and DVD.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer system in accordance with the embodiments herein. The system herein comprises at least one processor or central processing unit (CPU). The CPUs are interconnected via system bus to various devices such as a random-access memory (RAM), read-only memory (ROM), and an input/output (I/O) adapter. The I/O adapter can connect to peripheral devices, such as disk units and tape drives, or other program storage devices that are readable by the system. The system can read the inventive instructions on the program storage devices and follow these instructions to execute the methodology of the embodiments herein.

The system further includes a user interface adapter that connects a keyboard, mouse, speaker, microphone, and/or other user interface devices such as a touch screen device (not shown) to the bus to gather user input. Additionally, a communication adapter connects the bus to a data processing network, and a display adapter connects the bus to a display device which may be embodied as an output device such as a monitor, printer, or transmitter, for example.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The specification has described a method and a system for performing context-based application disablement on an electronic device. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

We claim:

1. A deep learning based system for learning human activities from video demonstrations using video augmentation, the deep learning based system comprising:
   one or more hardware processors; and
   a memory coupled to the one or more hardware processors, wherein the memory comprises a plurality of subsystems in the form of programmable instructions executable by the one or more hardware processors, wherein the plurality of subsystem comprises:
      a receiver subsystem configured for receiving one or more original videos from one or more data sources, wherein the one or more original videos comprises one or more human activities;
      a video augmentation subsystem configured for processing the received one or more original videos using one or more video augmentation techniques to generate a set of augmented videos, wherein the one or more video augmentation techniques comprises: performing one or more image transformation configurations, foreground synthesis, background synthesis, speed variation, motion variation, viewpoint variation, segment editing, and obfuscation rendering;
      a training video generator subsystem configured for generating a set of training videos by combining the received one or more original videos with the generated set of augmented videos;
      a deep learning model generator subsystem configured for generating a deep learning model for the received one or more original videos based on the generated set of training videos;
      a learning subsystem configured for learning the one or more human activities performed in the received one or more original videos by deploying the generated deep learning model; and
      an output subsystem configured for outputting the learnt one or more human activities performed in the received one or more original videos on a user interface.

2. The deep learning based system of claim 1, wherein the one or more video augmentation techniques comprises:
   performing one or more image transformation configurations to the received one or more original videos; and
   generating the set of augmented videos upon performing the one or more image transformation configurations to the received one or more original videos.

3. The deep learning based system of claim 1, wherein the one or more video augmentation techniques comprises:
   splitting foreground and background images from the received one or more original videos;
   generating an updated foreground image for the received one or more original videos; and
   overlaying the updated foreground image on top of the background image to generate the set of augmented videos, wherein the generated set of augmented videos comprises diverse foreground images.

4. The deep learning based system of claim 1, wherein the one or more video augmentation techniques comprises:
   splitting foreground and background images from the received one or more original videos;
   generating a random background image for the received one or more original videos; and
   overlaying the random background image on top of the foreground image to generate the set of augmented videos, wherein the generated set of augmented videos comprises diverse foregrounds.

5. The deep teaming based system of claim 1, wherein the one or more video augmentation techniques comprises:
   performing at least one of a frame sampling and a frame interpolation method to the received one or more original videos; and
   generating the set of augmented videos upon performing the at least one of a frame sampling and a frame interpolation method to the received one or more original videos.

6. The deep learning based system of claim 5, further comprises a frame rate handler subsystem configured for:
   determining whether the received one or more original videos comprises high frame rate; and
   down sampling the received one or more original videos to generate the set of augmented videos if the received one or more original videos comprises high frame rate.

7. The deep learning based system of claim 1, wherein the one or more video augmentation techniques comprises:
   modifying human motion in the received one or more original videos;
   modifying object location corresponding to the modified human motion in the received one or more original videos to generate a modified image; and
   performing interpolation on the modified image to generate the set of augmented videos.

8. The deep learning based system of claim 1, wherein the one or more video augmentation techniques comprises:
   reconstructing one or more three dimensional scenes from the received one or more original videos;
   generating a random viewpoint for the received one or more original videos using a three-dimensional view of the one or more original videos;
   reprojecting the reconstructed one or more three dimensional scenes with the generated random viewpoint to generate a reprojected image; and
   performing interpolation on the generated reprojected image to generate the set of augmented videos.

9. The deep learning based system of claim 1, wherein the one or more video augmentation techniques comprises:
   modifying segments of the received one or more original videos comprising the one or more human activities; and
   performing frame interpolation on the modified segments of the received one or more original videos to generate the set of augmented videos.

10. The deep learning based system of claim 1, wherein the one or more video augmentation techniques comprises:
    applying random obfuscations on the received one or more original videos to generate the set of augmented videos.

11. The deep learning based system of claim 1, wherein in generating the deep learning model for the received one or more original videos based on the generated set of training videos, the deep learning model generator subsystem is configured for:
    learning one or more actions associated with the one or more human activities performed in the training videos;
    classifying the learnt one or more actions into one or more action categories;
    detecting one or more anomalies in the classified one or more actions; and
    generating the deep learning model for the received one or more original videos based on the detected one or more anomalies.

12. A method for learning human activities from video demonstrations using video augmentation, the method comprising:

receiving, ley a processor, one or more original videos from one or more data sources, wherein the one or more original videos comprises one or more human activities;

processing, by the processor, the received one or more original videos using one or more video augmentation techniques to generate a set of augmented videos, wherein the one or more video augmentation techniques comprises: performing one or more image transformation configurations, foreground synthesis, background synthesis, speed variation, motion variation, viewpoint variation, segment editing, and obfuscation rendering;

generating, by the processor, a set of training videos by combining the received one or more original videos with the generated set of augmented videos;

generating, by the processor, a deep learning model for the received one or more original videos based on the generated set of training videos;

learning, by the processor, the one or more human activities performed in the received one or more original videos by deploying the generated deep learning model; and outputting, by the processor, the learnt one or more human activities performed in the received one or more original videos on a user interface.

13. The method of claim 12, wherein the one or more video augmentation techniques comprises:
performing one or more image transformation configurations to the received one or more original videos; and
generating the set of augmented videos upon performing the one or more image transformation configurations to the received one or more original videos.

14. The method of claim 12, wherein the one or more video augmentation, techniques comprises:
splitting foreground and background images from the received one or more original videos;
generating an updated foreground image for the received one or more original videos; and
overlaying the updated foreground image on top of the background image to generate the set of augmented videos, wherein the generated set of augmented videos comprises diverse foreground images.

15. The method of claim 12, wherein the one or more video augmentation, techniques comprises:
splitting foreground and background images from the received one or more original videos;
generating a random background image for the received one or more original videos; and
overlaying the random background image on top of the foreground image to generate the set of augmented videos, wherein the generated set of augmented videos comprises diverse foregrounds.

16. The method of claim 12, wherein the one or more video augmentation techniques comprises:
performing at least one of a frame sampling and a frame interpolation method to the received one or more original videos; and
generating the set of augmented videos upon performing the at least one of a frame sampling and a frame interpolation method to the received one or more original videos.

17. The method of claim 16, further comprises:
determining whether the received one or more original videos comprises high frame rate; and
down sampling the received one or more original videos to generate the set of augmented videos if the received one or more original videos comprises high frame rate.

18. The method of claim 12, wherein the one or more video augmentation techniques comprises:
modifying human motion in the received one or more original videos;
modifying object location corresponding to the modified human motion in the received one or more original videos to generate a modified image; and
performing interpolation on the modified image to generate the set of augmented videos.

19. The method of claim 12, wherein the one or more video augmentation techniques comprises:
reconstructing one or more three dimensional scenes from the received one or more original videos;
generating a random viewpoint for the received one or more original videos using a three-dimensional view of the one or more original videos;
reprojecting the reconstructed one or more three dimensional scenes with the generated random viewpoint to generate a reprojected image; and
performing interpolation on the generated reprojected image to generate the set of augmented videos.

20. The method of claim 12, wherein the one or more video augmentation techniques comprises:
modifying segments of the received one or more original videos comprising the one or more human activities; and
performing frame interpolation on the modified segments of the received one or more original videos to generate the set of augmented videos.

21. The method of claim 12, wherein the one or more video augmentation techniques comprises:
applying random obfuscations on the received one or more original videos to generate the set of augmented videos.

22. The method of claim 12, wherein generating the deep learning model for the received one or more original videos based on the generated set of training videos comprises:
learning one or more actions associated with the one or more human activities performed in the training videos;
classifying the learnt one or more actions into one or more action categories;
detecting one or more anomalies in the classified one or more actions; and
generating the deep learning model for the received one or more original videos based on the detected one or more anomalies.

* * * * *